United States Patent [19]

Tsuji et al.

[11] 4,296,316

[45] Oct. 20, 1981

[54] OPTICAL FOCUSING DEVICE

[75] Inventors: Shigeo Tsuji, Fujisawa; Takahisa Aikawa, Yokohama, both of Japan

[73] Assignee: Tokyo Shibaura Denki Kabushiki Kaisha, Kawasaki, Japan

[21] Appl. No.: 104,803

[22] Filed: Dec. 18, 1979

[30] Foreign Application Priority Data

Dec. 25, 1978 [JP] Japan .............................. 53-158529

[51] Int. Cl.$^3$ ................................................ G01J 1/36
[52] U.S. Cl. ........................................ 250/204; 369/45
[58] Field of Search ........................ 250/201, 204, 209; 179/100.1 G, 100.3 V, 100.3 G

[56] References Cited

U.S. PATENT DOCUMENTS

| | | | |
|---|---|---|---|
| 4,079,247 | 3/1978 | Bricot et al. ........................ | 250/201 |
| 4,163,149 | 7/1979 | Sawano et al. .............. | 179/100.1 G |
| 4,209,793 | 6/1980 | Ueno ................................... | 250/204 |

Primary Examiner—David C. Nelms
Attorney, Agent, or Firm—Oblon, Fisher, Spivak, McClelland & Maier

[57] ABSTRACT

An optical information system is provided with an optical focussing device for adjusting a position of an objective lens. The optical focussing device is comprised of a photosensing unit to which a part of a light beam reflected from a disc and passed through the objective lens is projected through a semitransparent mirror and a cylindrical lens. The photosensing unit for detecting a shape of the projected image of the light beam is assembled by a first photo-cell having a narrow photoelectric surface extending in the direction of movement of the projected image and second and third photo-cells each having a rectangular photoelectric surface closely disposed to the first photo-cell surface. The second and third photo-cells are connected to a adder to sum signals detected by both cells. The adder and the first photo-cells connected to a differential amplifier to compare the signal detected by the first photo-cell with the output of the adder. The differential amplifier is connected to a objective lens moving unit to supply a lens moving signal to the unit, thereby moving the objective lens to a predetermined position.

4 Claims, 12 Drawing Figures

OPTICAL FOCUSING DEVICE

BACKGROUND OF THE INVENTION

The invention relates to an optical focusing device in an optical information read-out system and, more particularly, to the improvement of a detecting unit of the optical focusing device.

The optical information read-out system, which has intensively developed recently, is used to read out the information recorded on a moving data carrier such as an information disc or tape by a convergent light beam. In such an optical information read-out system, a lightbeam must be focused onto the information recorded surface of the moving data carrier to produce accurately a covergence point thereon, in order to achieve an accurate focusing adjustment and to accurately read out the information from the moving data carrier. The optical information read out system is usually provided with an optical focusing devcie for ensuring the accurate focusing adjustment. U.S. Pat. No. 4,079,247 and the Japanese Patent Publication No. 37722/78 disclose the conventional optical focusing devices of the type in which an astigmatism optical element such as a cylindrical lens and a photosensing unit onto which a light beam passing through the cylindrical lens is projected are combined. The problem involved in the U.S. patent device is that, when the light beam focussed onto the information disc is directed from one track to another track, it is reflected through the optical path different from the previous optical path. Accordingly, the light beam spot is shifted on the photosensing unit, so that an inaccurate focusing adjustment is attained. This problem arises from the arrangement of the photoelectric cells forming the photosensing unit and the locations of the photoelectric cells. The optical device of the Japanese Patent Publication was proposed to solve the incorrect-positioning of the light spot. However, the optical focusing device still involves problems. For example, even though the focusing adjustment is not yet completed, its operation frequently is completed or even though the it is satisfactorily completed, the focusing adjustment operation is still continued, often.

SUMMARY OF THE INVENTION

Accordingly, an object of the invention is to provide an optical focusing device which can accurately detect whether a light beam is focussed to form a convergent point on a data carrier in an optical information read-out system or not. According to the invention, there is provided an optical focusing device in an optical information readout system comprising: a light source for producing light beams; an objective lens for focusing the light beams onto the surface of a data carrier; means for moving the said objective lens along the optical axis of the said objective lens; light beam orienting means positioned in the light beam path connecting the objective lens to the light source for orienting the light beam toward the objective lens to change a convergence point of the light beam on the surface of the data carrier; optical guiding means for guiding part of the light beams reflecting from or transmitted through the surface of the data carrier onto an observation plane; photodetecting means disposed on the observation plane which detects a shape of the projected image of the light beam guided by the optical guiding means and is comprised of a first narrow photoelectric area oriented in the direction of the movement of the projected image of the light beam oriented by the light beam orienting means, and second and third photoelectric surface closely disposed to the first photoelectric surface; means for summing the signals detected by the second and third surface; and electrical means for comparing the output signal from the summing means with the detected signal from the first photoelectric surface to provide a signal directing the lens moving means to move the lens in a specific direction.

The invention will be better understood from the following description taken in connection with the accompanying drawings, in which:

DETAILED DESCRIPTION OF THE PREFERRED EMBODIMENTS

Figure 1:
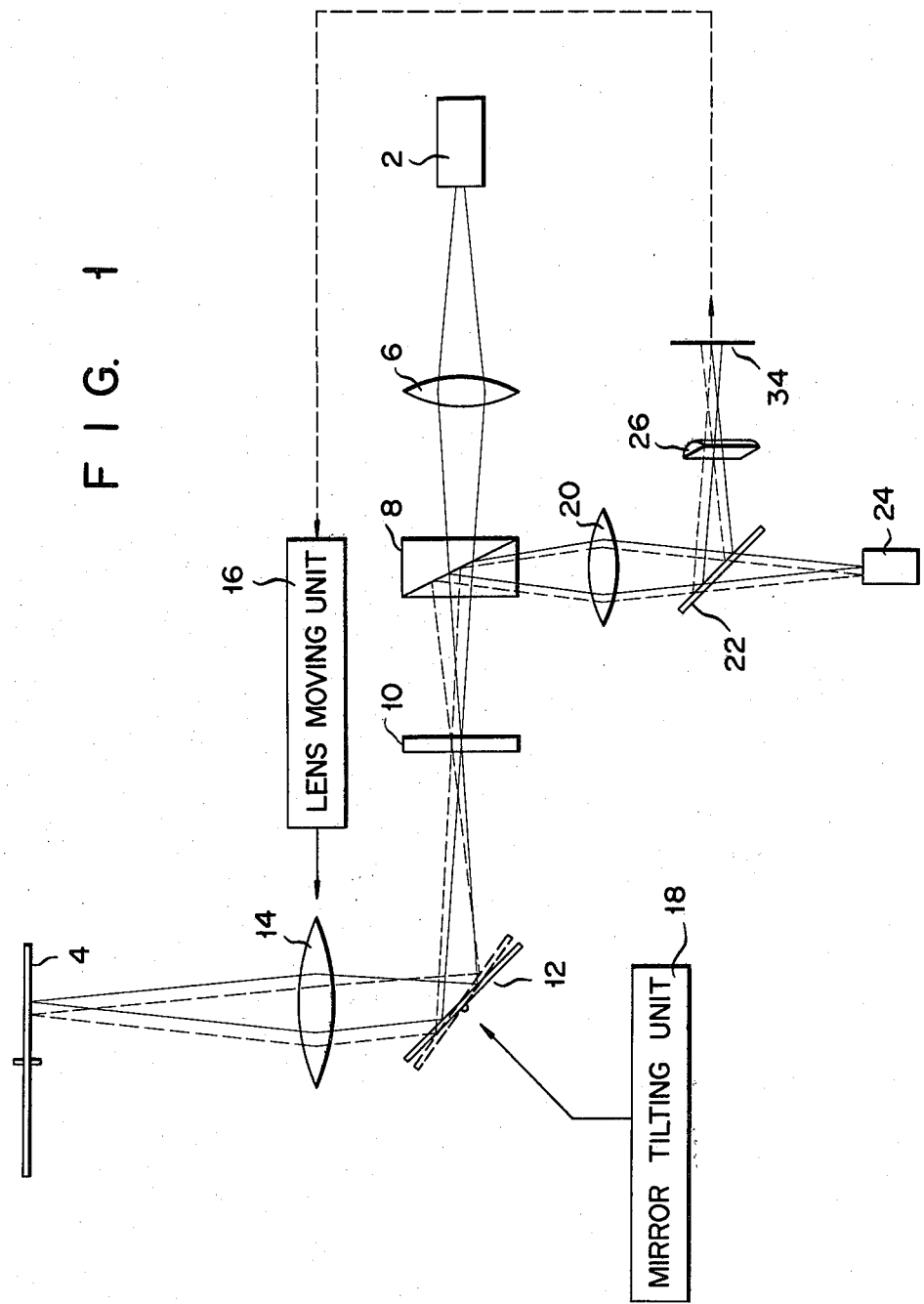
FIG. 1 schematically illustrates an optical information read-out system with an optical focusing device according to the invention.

Before preceeding with the description of an embodiment of an optical focusing device according to the invention, description will be made of a typical optical information read-out system to which an optical focusing device according to the invention is applied. In FIG. 1 illustrating the optical information read-out system, a laser 2 is a source for emitting linearly polarized light beams to be projected onto an information disc 4 such as a moving data carrier. Between the laser 2 and the information disc 4, there are arranged a diverging lens 6, a prism unit 8, a quarter-wave-length plate 10, a galvano-magnetic-mirror 12 and an objective lens 14, as shown. The objective lens 14, of which the optical axis is perpendicular to the surface of the information disc 4, is supported by a lens moving unit 16 in such a way that it is movable toward or away from the information disc 4 along the optical axis of the lens 14. Accordingly, the objective lens 14 is adjusted to be positioned so that it focuses the incident light beams at a desired position on the information disc 4 to form a convergence point thereon. The galvano-magnetic-mirror 12 is pivotably supported such that it can be tilted within a given range and orient the laser beam onto a desired track on the information disc 4 on which the information to be read out are recorded. The prism unit 8 is the combined prisms which can transmit a light beam emitted from the laser 2 and oriented to the information disc 4, and reflect the light beam which is reflected from the information disc 4 and passed through the quarter-wave-length plate 10 where its polarization direction is changed. On the optical path of the light reflected by the prism 8, there are arranged a convex lens 20, a semitransparent mirror 22 forming a part of the optical focusing device, and a photodetector 24 positioned at the convergence point of the convex lens 20 to detect an intensity of the reflected light thereby to read out the information recorded on the information disc 4 in the form of an electrical signal.

In the above-mentioned optical information read-out system, the light beam emitted from the laser 2 is passed through optical elements 6, 8, 10, 12 and 14 and is focused on the information disc 4. Then, the light beam is reflected from the information disc 4 and is incident upon a read-out photodetector 24 through the optical elements 14, 12, 10, 8 and 20. The reflected light beam from the information disc 4 includes the information recorded as pits on the disc 4 in the form of an intensity of light. Therefore, the information may be read out by detecting the intensity of the reflected light beam in the form of electrical signals. Incidentally, in this read-out system, the light beam reflected from the information disc 4 is used to read out the information; however, the light beam transmitted through the information disc 4 may be used for the same purpose in a similar way.

Figure 2:
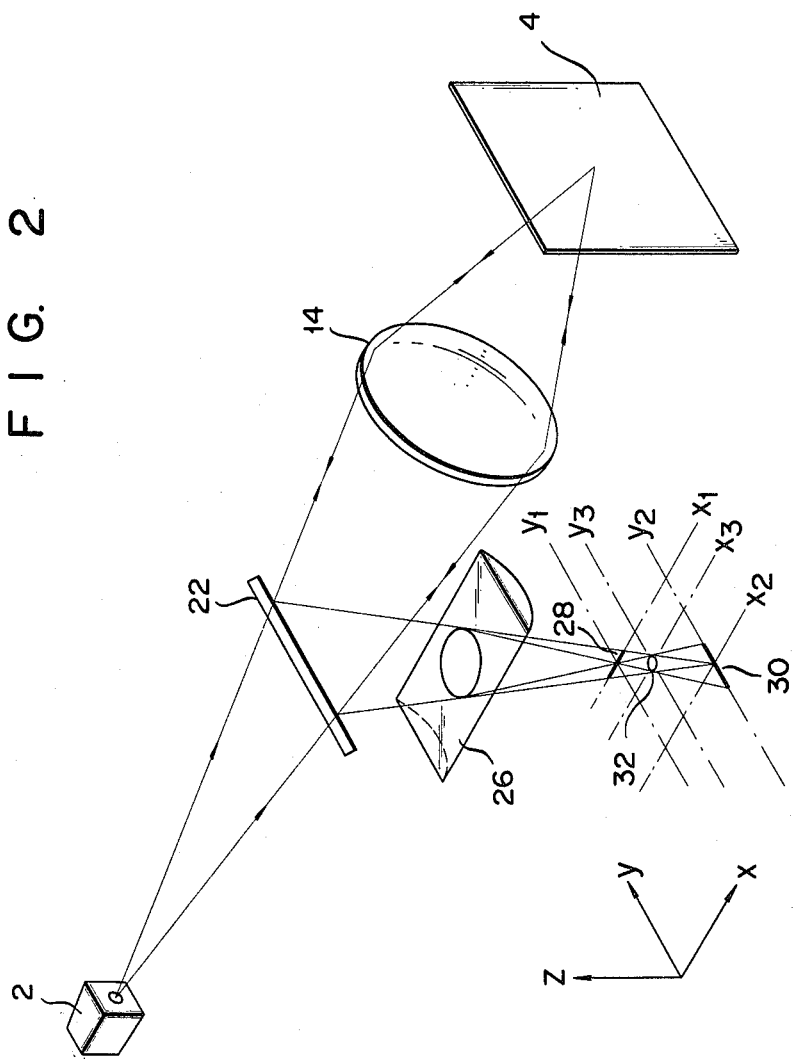
FIG. 2 illustrates a basic arrangement of optical elements used in the optical focusing device according to the invention.
Figure 3:
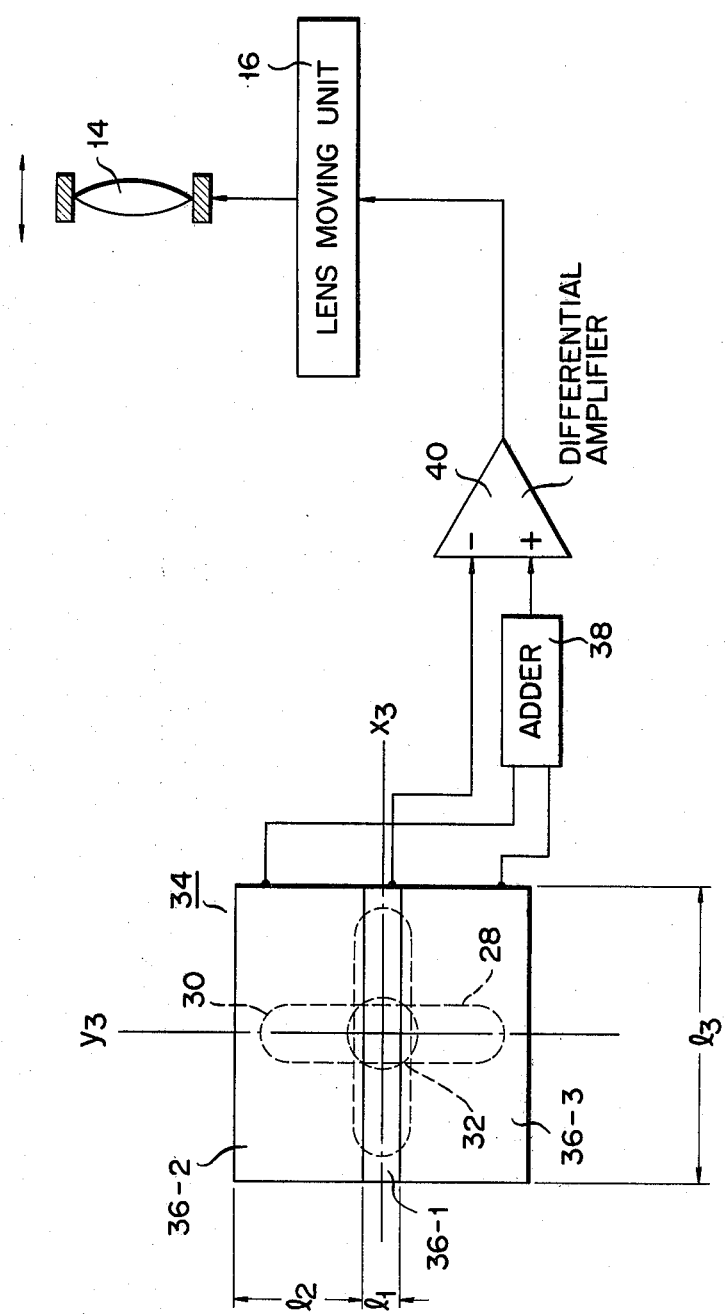
FIG. 3 shows a photosensing unit and its associated electronic components used in the optical focusing device according to the invention.

An optical focusing device incorporated into the optical information read-out system, which is an embodiment according to the invention, will be described with reference to FIGS. 1 and 2. In FIG. 2 illustrating schematically an optical focusing device using an astigmatism optical element, like symbols are used to designate like portions in FIG. 1. The astigmatism optical element which make an astigmatic abberation of the incident light is realized by a cylindrical lens 26. As known, the longitudinal magnification and the lateral magnification of the cylindrical lens 26 are different due to its curved configuration, so that the light beam transmitted through the cylindrical lens 26 forms different projected images as different positions. As shown in FIG. 2, the cylindrical lens 26 is disposed with the longitudinal axis along the X-axis and the optical axis along the Z-axis. When the light beam is projected into the cylindrical lens through the plane, a narrow projected image 28 oriented in the X-axis direction is formed on a plane $(x_1, y_1)$ near the cylindrical lens 26. A narrow projected image 30 oriented in the Y-axis direction is formed on a plane $(x_2, y_2)$ distanced from the cylindrical lens 26. Further, a substantially circular projected image 30 is formed on a plane $(x_3, y_3)$ between the two planes. The positions of the images 28, 30 and 32 are fixed so long as the relative positions among the information disc 4, the objective lens 14, the half mirror 22 and the laser 2. If one of those components is displaced, the position of the projected image is changed. Let it be assumed that, when the light beam transmitted through the objective lens 14 is focused to form accurately a convergence point on the information disc 4, the light beam reflected from the information disc 4 and then the half mirror 22 forms an image 32 as shown in FIG. 2 on the plane $(X_3, Y_3)$ through the cylindrical lens. On such a plane $(X_3, Y_3)$, the photosensing unit 34 is positioned, as shown in FIG. 3. The photosensing unit 34 detects a configuration and an orientation of an image of the light beam and also serves as the screen of the light beam. The foregoing embodiment of the optical focusing device of the invention is directed to improvement in the photosensing unit 34 which has three photocells 36-1 to 36-3 uniquely combined. Before entering the description of the structure of the photosensing unit 34, the nature of the projected image in the photosensing unit 34 will be described with reference to FIGS. 4a to 4c, with relation to the description referring to FIG. 2.

Figures 4A, 4B, 4C:
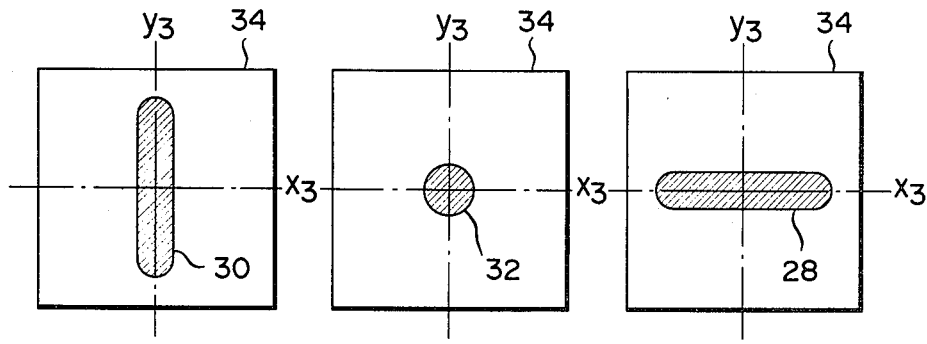
FIGS. 4a to 4c show the shapes of the images of light beams projected on the photosensing unit of an the optical focusing device according to the invention.

In FIG. 2, the configuration and the orientation of the projected image when the optical elements are fixed were described. As previously state, the objective lens 14 moves along the optical axis thereof for the focusing adjustment. Accordingly, on the photosensing unit 34 disposed on the plane $(X_3, Y_3)$, the objective lens 14 accurately forms a convergence point on the information disc 4. Only when the focusing adjustment is completed, that is to say, the objective lens is properly positioned, a circular image as indicated by slanted lines in FIG. 4b is formed. When the objective lens 14 is deviated from a correct position, in either direction, an image as shown in FIG. 4a or 4b is formed. The reason for this is that, with the deviation of the objective lens 14, the position where each projected image 28, 32 and 30 is shifts from its correct position. When the object lens 14 is displaced from a correct position toward the information disc 4 the image 30, which should essentially be formed on the plane $(x_2, y_2)$ as shown in FIG. 4a, is formed on the photosensing unit 34 fixed onto the plane $(x_3, y_3)$. On the other hand, when the objective lens 14 is displaced from the proper position apart from the information disc 4, the image 28, which should essentially be formed on the plane $(x_1, y_1)$ as shown in FIG. 4c, is formed on the photosensing unit 34 fixed on the plane $(x_3, y_3)$. When the objective lens 14 is shifted to be located at the correct position, an circular image 32 as shown in FIG. 4b is formed. If the configuration and the orientation of the image shown in FIG. 4a to FIG. 4c are detected, one can learn the position of the objective lens 14 and shift the lens 14 to a proper position. To this end, the photosensing unit 34 shown in FIG. 3 has the following construction.

Referring to FIG. 3, the photosensing unit 34 has a first photo-cell 36-1 having a narrow light-sensing surface, and other photo-cells 36-2 and 36-3 rectangular light sensing surfaces closely disposed on both longer sides of the first photo-cell 36-1. These light sensing surfaces are flush with each other. The light sensing surfaces are orthogonal to the Z-axis, i.e. the plane $(x_3, y_3)$, the long axis of the photo-cell; 36-1 is disposed along the X- or Y-axis (X-axis in the figure); the Z-axis, i.e. the optical axis of the cylindrical lens 26, passes through the substantial center of the photosensing surface of those three combined cells. The width of the light sensing area of the first photo-cell 36-1 is so selected that the area of a part of the circular image 32 which is formed on the first photo-cell 36-1 when the objective lens 14 is shifted to the correct position is substantially equal to the remaining area of the circular image formed on each of the second and third photo-cells 36-2 and 36-3, that is to say, an amount of light detected by the photo-cell 36-1 when the circular image 32 is formed is equal to the total amount of lights of the circular image 32 detected by the second and third cells 36-2 and 36-3. The second and third photo-cells 36-2 and 36-3 are connected to an adder 38 which is further connected to the input terminal of the differential amplifier 40, together with the first photo-cell 36-1. The output terminal of the differential amplifier 40 is connected to the lens moving unit 16 for moving the objective lens 14 in response to the output signal.

In the photosensing unit 34 with the combination of the three photo-cells 36-1 to 36-3, when the objective lens 14 is much close to the information disc 4 and the projected image as indicated by reference numeral 30 is formed on the photosensing unit 34, the amount of the light incident upon the first photo-cell 36-1 is smaller than the total amount of the light incident upon the second and the third photo-cells 36-2 and 36-3. The added signal which is the sum of the signals detected by the second and third photo-cells 36-2 and 36-3 is larger than a signal detected by the first photo-cell 36-1. When those signals are applied to the differential amplifier 40, the differential amplifier 40 applies a positive voltage to the lens moving unit 16. As a result, the lens moving unit moves the objective lens 14 apart from the information disc 14. When the objective lens 14 is much distant from the information disc 4 and the projected image as indicated by reference numeral 32 is formed on the photosensing unit 34, the amount of the light incident upon the first photo-cell 36-1 is larger than the total amount of the light incident upon the second and third photo-cells 36-2 and 36-3. Accordingly, the added signal which is the sum of the signals detected by the second and third photo-cells 36-2 and 36-3 is smaller than the signal detected by the first photo-cell 36-1. When those signals are applied to the differential amplifier 40, the differential amplifier 40 supplies the negative voltage to the lens moving unit 16. As a result, the lens moving unit 16 moves the objective lens 14 toward the information disc 14. When the objective lens 14 is moved toward or away from the information disc 14 and the objective lens is positioned properly, a projected image as indicated by reference numeral 32 in FIG. 3 is produced on the photosensing unit 34. The amount of the light incident upon the first photo-cell 36-1 is substantially equal to the amount of the light incident upon the second and third photocells 36-2 and 36-3, and thus is approximately equal to the detected signal detected by the second and third photo-cells 36-2 and 36-3, which are added by the adder 38. When those signals are applied to the differential amplifier 40, the differential amplifier 40 stops the supply of the output signal to the lens moving unit 16. As a result, the lens moving unit 16 stops the objective lens 14 at the correct position.

The reason why the photosensing unit 34 is composed of the band-like photo-electric cells 36-1 and the two rectangular photo-electric cells 36-2 and 36-3 will be described.

Figure 5:
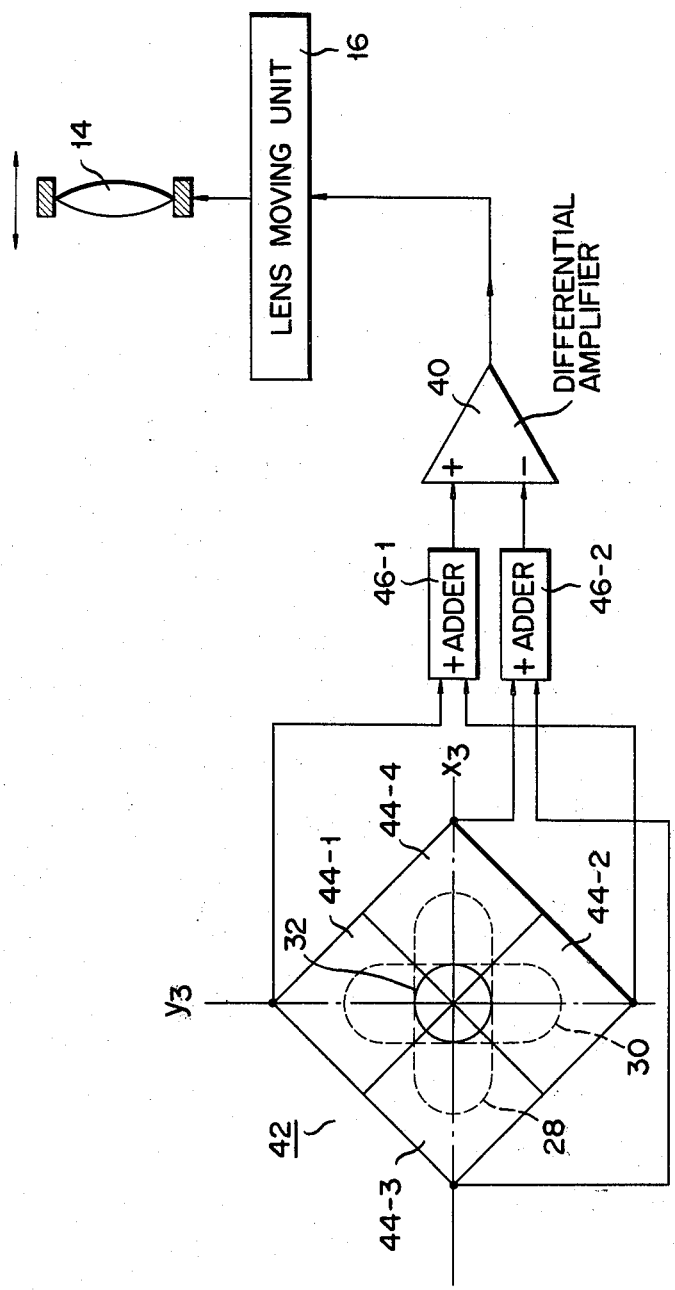
FIG. 5 shows a photosensing unit and its associated electronic components of a conventional optical focusing device in comparison with the optical focusing device shown in FIG. 3.

FIG. 5 shows a photosensing unit 42 disclosed in U.S. Pat. No. 4,079,247. The major difference of the photosensing unit 34 from the conventional one is that, whereas the conventional photosensing unit 42 is comprised of the combination of the substantially square photo-cells 44-1 to 44-4, the photosensing unit according to the invention is comprised of the combination of three photo-cells 36-1 to 36-3. Further, the conventional optical focusing device includes two address 46-1 and 46-2. The first adder 46-1 is connected to the first and the second cells 36-1 and 36-2. The second adder 46-2 ic connected to the third and fourth cells 36-3 and 36-4. Both the adders 46-1 and 46-2 are connected to the differential amplifier 40.

Figures 6A, 6B:
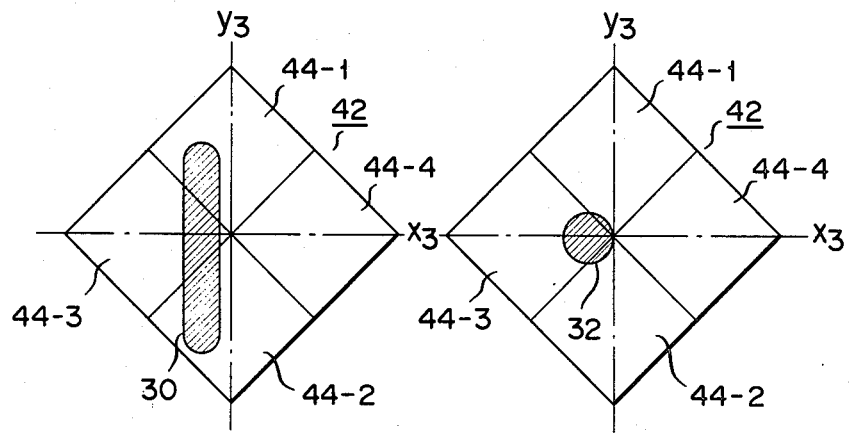
FIGS. 6a and 6b illustrate undisired images of light beams projected on the photosensing unit shown in FIG. 5.

The images projected onto the photosensing unit 42 are designated by the same reference numerals as those used in the embodiment of the invention, and the detailed explanation thereof will be omitted. For further detail, reference should be made to U.S. Pat. No. 4,079,247. The photosensing unit disclosed in the U.S. patent can correctly position the objective lens 14 in a normal condition. When the galvano-magnetic-mirror 12 is tilted for changing from one to another, particularly when the galvano-magnetic-mirror 12 is greatly tilted, a problem arises. Let us consider the problem referring again to FIG. 1. In the figure, the laser beam paths of the laser beams emitted from the laser 2 and reflected by the galvano-magnetic-mirror 12 before it is tilted is indicated by a continuous line. The paths of the laser beams reflected from the galvano-magnetic-mirror 12 tilted by the mirror tilting unit 18 are indicated by broken lines. The laser beam path from the laser 2 to the galvano-magnetic-mirror 12 is invariable irrespective of the tilt of the galvano-magnetic-mirror 12 and therefore this path is indicated by a continuous line. As seen from FIG. 1, after the galvano-magnetic-mirror 12 is tilted, the light beam path is different from that before it is tilted. As a result, the two light beam paths in the focusing device are different. When the galvano-magnetic-mirror 12 is tilted, the images 28, 30 and 32 projected onto the photosensing unit 34 are all shifted in the x-direction. As a result, those images 30, 32 and 28 (not shown) are each formed at a position displaced from the center of the photosensing unit 34, as shown in FIG. 6a or 6b. The detected values of the images 30 and 32 by the cells indicate that the objective lens 14 are not positioned at the correct position. However, at this time, the image 30 is circular and therefore the objective lens 14 is at the correct position. Accordingly, the detected values do not indicate the correct position. As a result, the objective lens 14 is erroneously moved, resulting in the erroneous adjustment.

In the optical focusing device disclosed in the Japanese Patent Publication No. 37722/78 which was developed to solve the problem of the above-mentioned U.S. patent when the image 30 or 32 moves to be formed on the photosensing unit, the outputs from the adders are equal to each other, as the image 32 is produced. Accordingly, even though the focusing adjustment is not completed, the objective lens 14 is stopped at an erronous position, so that the erronous information are read out from the optical information read-out system.

Figure 7A:
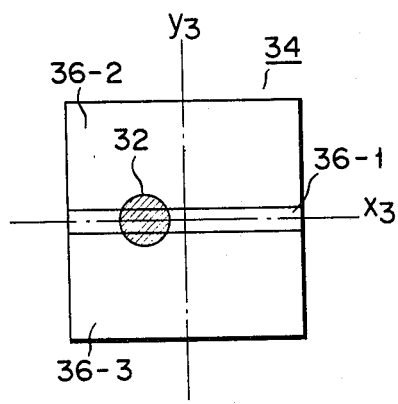
FIGS. 7a and 7b illustrate shifted images on the photosensing unit shown in FIG. 3.
Figure 7B:
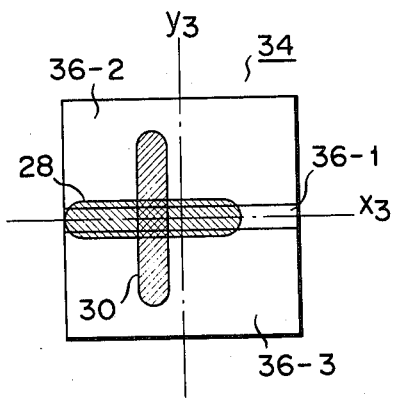

The optical focusing device according to the invention can solve such a problem. Even if the images 28, 30 or 32 is deviated from the center of the photo-sensing unit 34, as shown in FIGS. 7a and 7b, the photo-cells 361, 36-2 and 36-3 can correctly detect the light distribution, i.e. the configurations and the orientations of the images 28, 30 and 32.

Figure 8:
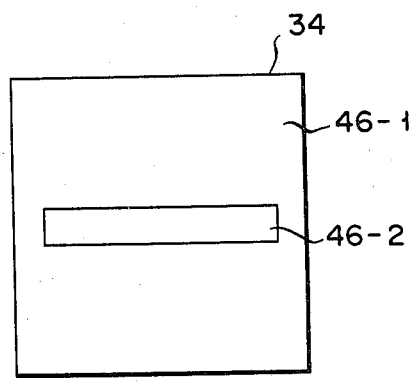
FIG. 8 shows a modification of the photosensing unit shown in FIG. 3.

FIG. 8 shows another embodiment of the photosensing unit 34 assembled into the optical focusing device according to the invention. The photosensing unit 34 shown in FIG. 3 has the three combined photo-cells 36-1 to 36-3. In the photosensing unit 34 shown in FIG. 8, a couple of photo-cells 46-1 and 46-2 are combined in such a manner that a rectangular photo-cell 46-2 is positioned in the central portion of the photo-cell 46-1. In this embodiment, the adder 38 is not used and the cell 46-1 is directly coupled with the differential amplifier 40.

In the embodiment of the optical focusing device shown in FIGS. 1 and 3, the astigmatism optical element 26 is provided between the semi-transparent mirror 22 and the photosensing unit 34. However, this is not essential to the invention. When the element 26 is not used, the images 28 and 30 are not produced; however, the size of the image 32 changes depending on the position of the objective lens 14 and the outputs of the photo-cells 36-2 and 36-3 are approximately equal to that of the photo-cell 36-1 at the correct position of the lens 14. Therefore, the cylindrical lens, or the astigmatism optical element, is not necessary for the focusing adjustment of the objective lens 14. When the cylindrical lens 26 is not used, the construction of the optical focusing device is simple and the adjustment of the optical system is easy. In case where the cylindrical lens 26 is not provided, the good sensitivity of the photosensing unit 34 is obtained under the condition of $R \leq l_1 + l_2$, $l_2 \geq 1.6l$ and $l_3 \geq R$, where R is the diameter of the circular image on the photosensing unit 34 when the objective lens 14 is correctly positioned, the light amount of the circular image 32 being proportional to $e^{-2}$, $l_1$ is the width of the photo-cell 36-1 as shown in FIG. 2, and $l_3$ is the lengths of the cells 36-2 and 36-3.

As described above, when the optical focusing device according to the invention is used, a correct focusing adjustment is ensured in the optical information read-out system.

Further, the optical focusing device according to the invention employs the photosensing unit 34 having three photocells 36-1 to 36-3 closely disposed side by side. With such an arrangement of the photo-cells, if the acute edges of p-n junction of the cells are curved to improve the brake down characteristics, the detecting ability of the unit 34 is never degraded. If it so done, there is eliminated such a case where the electric field is concentrated at the edges of the photo-cells to damage the cells. Therefore, the performance of the cell is not deteriorated. This feature is very advantageous. In the conventional photosensing unit, the edges of the cell must be positioned in the area onto which the image is projected, so that the detecting ability and the reliability of the unit are stable.

What we claim is:

1. An optical focusing device for an optical information read-out system comprising:
    an object lens for focusing a light beam onto the surface of a data carrier, thereby forming a projected image on the surface of the data carrier;
    means for moving said objective lens along the optical axis of said objective lens;
    light beams orienting means positioned in the light beam path between said objective lens and said light source for orienting the light beam toward said objective lens to change the position of the projected image of the light beam on the surface of the data carrier;
    optical guiding means for guiding part of the light beams reflecting from or transmitted through the surface of the data carrier onto an observation plane;
    photodetecting means disposed on said observation plane which detects a shape of the projected image of the light beam guided by said optical guiding means and is comprised of a first narrow photoelectric surface extending in the direction of movement of the projected image of the light beam which is effected by said light beam orienting means, and second and third photoelectric surface closely disposed to the first photoelectric surface;
    means for summing the signals detected by said second and third surface; and
    electrical means for comparing the output signal from said summing means with the detectes signal from said first photoelectric surface to provide a signal to said lens moving means, thereby moving said objective lens to a predetermined position.

2. An optical focusing device for an optical information read-out system according to claim 1, further comprising optical means for introducing astigmation on the optical axis of said objective leans which is disposedon the path of the light beam guided by said optical guidance means.

3. An optical focusing device for an optical information read-out system according to claim 1, wherein the second and third photoelectric surfaces of said photosensing means and said adder means are comprised of a single photo-electric cell, and the first photo-electric surface of said photosensing means is another photoelectric cell disposed in said cell.

4. An optical focusing device for an optical information read-out system according to claim 1, wherein the first, second and third photoelectric surface are provided on the first, second and third photo-cells respectively.

* * * * *